2,995,570
CYCLIC DIMERS OF CERTAIN FURAN AND
THIOPHENE TYPE COMPOUNDS
Hilmer Ernest Winberg, Wilmington, Del., assignor to
E. I. du Pont de Nemours and Company, Wilmington,
Del., a corporation of Delaware
No Drawing. Filed Jan. 21, 1958, Ser. No. 710,182
8 Claims. (Cl. 260—329)

This invention relates to cyclic dimers and their preparation and, more particularly, to tricyclic compounds containing two heterocyclic rings and a process of preparing same.

This application is a continuation-in-part of my copending application Serial No. 382,224, filed September 24, 1953, now abandoned.

Cyclic organic compounds containing heterocyclic rings as part of the over-all ring structure are useful in various applications because of characteristics resulting from the unusual structure of such compounds. As a consequence, the introduction of new compounds of this type is highly desirable.

An object of the present invention is to provide a new class of organic compounds containing heterocyclic rings and a process of preparing same. A still further object is to provide a new class of cyclic dimers containing two heterocyclic rings and a process of preparing same. Other objects will be apparent from the description of the invention given hereinafter.

The above objects are accomplished according to the present invention by subjecting a monomeric dialkylidene five-membered heterocyclic compound having in the 1-position of the heterocyclic ring an atom from the group consisting of oxygen and sulfur, joined to two annular carbons, and having attached to one of two carbons in any of the 2,3-, and 2,5-positions of the heterocyclic ring a =CH$_2$ group and to the other of these carbons a =CHR' group wherein R' is hydrogen or a monovalent hydrocarbon radical of 1 to 6 carbons, inclusive, said heterocyclic ring containing a double bond, to a temperature of 0° C.–200° C. in the presence of an addition polymerization inhibitor until dimerization thereof is complete. The dimers of these dialkylidene five-membered heterocyclic compounds are new and useful in a number of applications.

The preferred group of dimers of this invention are those having the formula

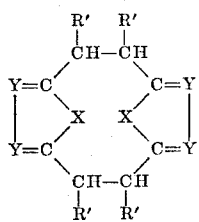

wherein X is oxygen or sulfur, both X's being the same, Y is a saturated aliphatic hydrocarbon radical and at least two R"s are hydrogen each in the alpha position to a different five-membered ring and the other two are identical and either hydrogen or monovalent hydrocarbon radicals of 1 to 6 carbons, inclusive. Compounds of this type in which X is a chalcogen of atomic number 8 to 16, inclusive, i.e., oxygen or sulfur, and Y is CH, are the most preferred group since the dialkylidene five-membered heterocyclic compounds from which they are prepared, are more available.

The dimers represented by the above formula include the various geometric and optical isomers. The term "geometrical isomers" includes the type of isomers commonly referred to as cis-trans isomers and also the three-dimensional isomers resulting from the rigid structure, which restricts free rotation, produced by the bridging of two unsymmetrical five-membered rings.

The dimers represented by the above formula are obtained by subjecting to a temperature of 0° C.–200° C. in the presence of an addition polymerization inhibitor until dimerization thereof is complete, dialkylidene heterocyclic compounds having the formula

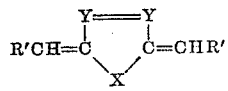

wherein X is oxygen or sulfur, Y is a saturated aliphatic hydrocarbon radical, and at least one R' is hydrogen and the other is hydrogen or a monovalent hydrocarbon radical of 1 to 6 carbons, inclusive.

The monomeric dialkylidene five-membered heterocyclic compounds used as starting materials in the process of this invention are disclosed and claimed in application Serial No. 382,222, entitled "Monomeric Compounds and Their Polymers," and filed September 24, 1953, jointly in the names of John Lynde Anderson and Hilmer Ernest Winberg, said application maturing into U.S. Patent No. 2,876,216 on March 3, 1959. These compounds can be prepared by pyrolyzing a five-membered heterocyclic quaternary ammonium hydroxide having in the 1-position of the heterocyclic ring an oxygen or sulfur joined to two annular carbons, having attached to one of two carbons in any of the 2,3-, and 2,5-positions of the heterocyclic ring a —CH$_2$N(CH$_3$)$_3$OH group, and to the other of these two carbons a —CH$_2$R' group, R' being hydrogen or a monovalent hydrocarbon radical of 1 to 6 carbons, inclusive. The preparation of the quaternary ammonium hydroxide compounds as above is described in detail and claimed in applicant's application Serial No. 382,221, filed of even date herewith, and entitled "Organic Compounds," now abandoned.

The process of this invention is conveniently carried out by adding to the monomeric dialkylidene heterocyclic compound used as the starting material a small quantity, e.g., 0.2% to 5% by weight thereof, of an addition polymerization inhibitor such as hydroquinone or phenothiazine, and then subjecting the mixture to a temperature of 0° C. to 200° C., preferably between 50° C. and 150° C., until dimerization of the monomer is complete.

The dimerization can be carried out in the presence or absence of a solvent or reaction medium. An inert organic liquid such as ethyl alcohol or benzene is a satisfactory reaction medium. In such case, the dimerization is conveniently carried out at the temperature of the refluxing reaction mixture. The time required to complete the dimerization is dependent on the particular monomeric dialkylidene heterocyclic compound and the particular temperature being employed. In general, the higher the temperature the shorter is the reaction time required for complete dimerization. Reaction times ranging from a few minutes to several hours, e.g., 15 minutes to 3 hours, are generally useful.

As shown above, the monomeric dialkylidene heterocyclic compound to be dimerized is prepared by pyrolysis of a quaternary ammonium hydroxide. The quaternary ammonium hydroxides in question are normally obtained in aqueous solution as disclosed in applicant's application above. Rather than isolating the quaternary ammonium hydroxide by distilling off the water and thereafter pyrolyzing the quaternary ammonium hydroxide to form the monomeric dialkylidene heterocyclic compound to be dimerized, one embodiment of the process of this invention comprises adding to the aqueous solution of the quaternary ammonium hydroxide, without going through the step of isolating the compound, an inert, water-immiscible organic liquid which forms an azeotrope with water, removing the water by azeotropic distillation of the mixture prior to decomposition of the quaternary ammonium hydroxide, and thereafter thermally decomposing the quaternary ammonium hydroxide in the presence of a polymerization inhibitor and dimerizing the dialkylidene heterocyclic compound without isolating the monomer.

The latter two steps are preferably carried out at the temperature of the refluxing reaction mixture. The polymerization inhibitor can be added to the aqueous solution of the quaternary ammonium hydroxide at the start of the process. Numerous water-immiscible organic liquids which are inert to the reactants and form azeotropes with water are available, including benzene, toluene, xylene, hexane, and monochlorobenzene.

In preparing the preferred group of dimers of this invention by the above process, there are used heterocyclic quaternary ammonium hydroxides having the formula

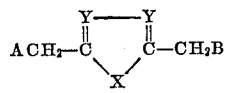

wherein X is oxygen or sulfur, Y is a saturated aliphatic hydrocarbon radical, and one of A and B is

and the other is a monovalent hydrocarbon radical of 1 to 6 carbons, inclusive.

The dimerized reaction product can be isolated from the reaction mixture in various ways. If a low boiling solvent has been used in the reaction, it can be removed by evaporation or distillation. The solid residue obtained is then extracted with a solvent for the dimer and purified by recrystallization. If the reaction medium is a solvent for the dimer at elevated temperatures but not at ordinary temperatures, the dimer can be precipitated from the reaction mixture by cooling.

The following examples in which all proportions are by weight unless otherwise stated, illustrate specific embodiments of the present invention.

*Example I*

A mixture of 40 parts of silver oxide and a solution of 40 parts of 5-methyl-2-furfuryltrimethylammonium iodide in 100 parts of distilled water is agitated continuously for one hour at room temperature. The reaction mixture is then filtered under an atmosphere of nitrogen and the water is removed from the filtrate under vacuum at 30° C. The resulting solid quaternary ammonium hydroxide is charged into a reaction vessel connected to a receiver cooled by a mixture of solid carbon dioxide and acetone. The receiver is charged with 0.2 part of hydroquinone and 15 parts of absolute ethyl alcohol. The solid quaternary ammonium hydroxide is heated at 150° C. and at 3 mm. mercury pressure until only a trace of material remains in the reaction vessel. At this point an additional 25 parts of absolute ethyl alcohol is added to the product in the receiver.

On warming to room temperature the product in the receiver forms a clear solution of 2,5-dimethylene-2,5-dihydrofuran which is heated gently at reflux temperature for two hours. The solid product which forms is filtered from the alcohol and then extracted with hexane in a Soxhlet extractor. A white glossy solid precipitates from the hexane extract and there is isolated 8.66 parts of 5,5'-ethylene-1,2-di(2-furyl)ethane, melting at 188–189° C. On concentration of the mother liquor, an additional 0.9 part of the dimer is obtained.

*Analysis.*—Calcd. for $(C_6H_6O)_2$: C, 76.57%; H, 6.43%; mol. wt. 188.2; quantitatitve hydrogenation, 0.043 g. of hydrogen/g. of sample (four double bonds). Found: C, 76.56%, H, 6.37%; mol. wt. (determined ebullioscopically in benzene), 191, 188; quantitative hydrogenation (over $PtO_2$), 0.045, 0.040; 0.044, 0.044.

*Example II*

A solution of 29.5 parts of 5-ethyl-2-furfuryltrimethylammonium iodide in 50 parts of water is shaken with 23 parts of silver oxide. The mixture is filtered and the water is removed from the filtrate at a maximum temperature of 30° C. The residual quaternary hydroxide is decomposed at 50° C.–100° C./150–3 mm. in a decomposition flask connected to a receiver cooled by a mixture of solid carbon dioxide and acetone, until decomposition is complete as indicated by only a trace of residue remaining in the decomposition flask. The 2-methylene-5-ethylidene-2,5-dihydrofuran condensed in the cooled receiver, into which had been charged 0.1 part of hydroquinone and 24 parts of absolute alcohol, is subjected to gentle reflux for 2 hours. The resulting mixture is filtered hot and the filtrate is cooled. The resulting crystals are removed by filtration, amount to 1.5 parts (14% of theory), and have a melting point of 126–138° C. The product consists of an isomeric mixture of dimers of 2-methylene-5-ethylidene-2,5-dihydrofuran. When recrystallized from absolute alcohol, the product melts at 132–142° C.

*Analysis.*—Calcd. for $(C_7H_8O)_2$: C, 77.74%; H, 7.45%; mol. wt., 216. Found: C, 77.54%, 77.48%; H, 7.59%, 7.46%; mol. wt., 212, 206.

In the above two examples, the desired dimer is formed from the corresponding monomer which was first isolated. This involved removal of the water from the aqueous solution of the quaternary ammonium hydroxide by distillation under vacuum and then decomposition of the solid quaternary ammonium hydroxide to the monomer.

*Example III*

A warm solution of 9 parts of (5-benzyl-2-furfuryl)-trimethylammonium iodide in 40 parts of water is agitated for one hour with 5.8 parts (100% excess) of silver oxide. The mixture is then filtered under nitrogen and the precipitate is washed with water until the filtrate is free of iodide ion. The filtrate is concentrated under vacuum at a maximum temperature of 30° C. When the last of the water has been removed, the residue decomposes with the evolution of trimethylamine and the formation of a solid residue. The residue is heated in an oil bath up to 150° C., but there is no further evidence of decomposition. The solid is extracted with water at 60° C. followed by extraction with methanol in a Soxhlet extractor. The insoluble polymer amounts to 3 parts (70% of theory) and it softens above 75° C. to a viscous melt which gradually darkens as the temperature is raised to 100° C.

The methanol extract is evaporated to dryness and the semi-solid residue is crystallized from ethyl alcohol. There is obtained 0.25 part (6% of theory) of brown needles, M.P. 182–186° C., of an isomeric mixture of dimers of 5-benzylidene-2-methylene-2,5-dihydrofuran. On recrystallization from absolute alcohol, including a carbon black treatment, the resulting white needles melt at 182–186° C.

*Analysis.*—Calcd. for $(C_{12}H_{10}O)_2$: C, 84.68%; H, 5.92%; mol. wt. 340.4. Found: C, 84.68%; H, 6.07%; mol. wt. 339.0.

When a polymerization inhibitor such as phenothiophene is added to the reaction mixture containing (5-benzyl-2-furfuryl)trimethylammonium hydroxide, the yield of cyclic dimer is increased and the yield of polymer is decreased.

The (5-benzyl-2-furfuryl)trimethylammonium iodide used in Example III is prepared by first reacting phenylfurylmethane with dimethylamine hydrochloride and paraformaldehyde to form (5-benzyl-2-furfuryl)trimethylamine and then reacting this intermediate with methyl iodide as described in further detail below:

A mixture of 7 parts of phenylfurylmethane, 5 parts of dimethylamine hydrochloride, 2 parts of paraformaldehyde and 20 parts of denatured alcohol is refluxed with stirring for 3 hours. The solvent is then removed from the clear solution, and the residue is treated with a solution of 2 parts of sodium hydroxide in 10 parts of water. The resulting oil is extracted with ether, the extract washed twice with water and dried with anhydrous magnesium sulfate. After removal of the solvent the residue is distilled to give 5.87 parts (61.5% of theory) of colorless (5-benzyl-2-furfuryl)dimethylamine, boiling largely at 115–117° C./1.5 mm. On redistillation the compound boils at 121° C./2.1 mm., $n_D^{25}$ 1.5298.

*Analysis.*—Calcd. for $C_{14}H_{17}NO$: C, 78.10%; H, 7.96%; N, 6.51%. Found: C, 77.82%; H, 8.00%; N, 6.78%.

The infrared spectrum of this compound indicates it to be a 2,5-disubstituted furan, since it contains strong absorption at 12.7μ and 6.4μ, consistent with this type of substitution.

A solution of 5.87 parts of this (5-benzyl-2-furfuryl) dimethylamine in 71 parts of absolute diethyl ether is treated with excess methyl iodide while cooling in an ice bath. The quaternary iodide precipitates rapidly. After 3 hours it is filtered, washed with ether and dried. The quaternary iodide amounts to 9 parts (93% of theory) and when crystallized from absolute alcohol melts at 140–141° C.

*Analysis.*—Calcd. for $C_{15}H_{20}INO$: C, 50.43%; H, 5.64%; N, 3.92%. Found: C, 50.38%; H, 5.81%; N, 3.98%.

In the following three examples, the monomer is not isolated, an inert water-immiscible organic liquid capable of forming an azeotrope with water being added to the aqueous quaternary ammonium hydroxide solution, the water thereupon being removed by azeotropic distillation, and the quaternary ammonium hydroxide being decomposed and the desired dimer being formed by heating the reaction mixture to reflux temperature. This procedure is particularly advantageous when the monomer in question is relatively unstable and tends to polymerize at low temperature.

Example IV

An aqueous solution of 5-methyl-2-furfuryltrimethylammonium hydroxide is prepared from 40 parts of the corresponding quaternary ammonium iodide as in Example I except that the quaternary ammonium iodide is not isolated but left in the aqueous solution. This aqueous solution is charged into a reaction flask with 350 parts of benzene and 0.3 part of phenothiazine. The mixture is heated to reflux temperature with stirring and the water is removed from the azeotrope by a water separator. When the water is completely removed, the quaternary ammonium hydroxide slowly decomposes. After three hours at reflux temperature decomposition is complete. The benzene is then removed by distillation and the dark colored residue is extracted with boiling ether and then by boiling hexane. On cooling the ether and hexane solutions a solid precipitates. There is obtained a total of 7.65 parts of 5,5'-ethylene-1,2-di(2-furyl)ethane.

Substitution of xylene for benzene as the reaction medium in Example IV increases the rate of decomposition of the quaternary ammonium hydroxide after the water is removed. Under these conditions, only one hour is required for complete decomposition.

Example V

A solution of 29 parts of 5-methyl-2-thenyltrimethylammonium chloride in 50 parts of water is agitated with the freshly prepared silver oxide from 36 parts of silver nitrate for 1 hour. The mixture is then filtered under nitrogen. The filtrate is charged into a reaction flask with 0.2 part of phenothiazine and 320 parts of toluene. The mixture is refluxed with stirring and the water is removed from the azeotrope by a water separator. When the water is completely removed, the quaternary ammonium hydroxide decomposes. After 1 hour at reflux temperature, the mixture is filtered hot. Removal of the solvent from the filtrate by distillation leaves a white solid. After crystallization from acetone there is obtained 3.0 parts (19% of theory) of 5,5'-ethylene-1,2-di(thienyl)-ethane, M.P. 188–192° C. Crystallization from ether gives fine white needles, M.P. 194.5–196° C.

*Analysis.*—Calcd. for $(C_6H_6S)_2$: C, 65.44%; H, 5.49%; S, 29.06%; mol. wt. 220. Found: C, 65.51%, 65.56%; H, 5.51%, 5.56%; S, 29.02%, 29.08%; mol wt. (determined ebullioscopically in benzene), 218, 204.

Example VI

An aqueous solution of 2-methyl-3-furylmethyltrimethylammonium hydroxide prepared according to the method of preparing the quaternary ammonium hydroxide in Example I but from 8 parts of 2-methyl-3-furylmethyltrimethylammonium chloride, is charged into a reaction vessel with 250 parts of toluene and 0.2 part of phenothiazine. The mixture is heated to reflux temperature with stirring and the water is removed from the azeotrope by a water separator. After all the water is removed, the mixture is refluxed for one hour, during which time the quaternary ammonium hydroxide decomposes. After removal of the toluene by distillation, the residue is recrystallized from absolute alcohol and there is obtained 1.50 parts of the dimer of 2,3-dimethylene-2,3-dihydrofuran, melting at 48–50° C. Concentration of the mother liquor gives a further 0.60 part of dimer melting at 42–45° C. This is a total yield of 2.10 parts corresponding to 53% of theory. Sublimation of the dimer at 3 mm. pressure and 100° C. raises the melting point to 54–55° C.

*Analysis.*—Calcd. for $(C_6H_6O)_2$: C, 76.57%; H, 6.43%; mol. wt., 188. Found: C, 76.61%; H, 6.77%; mol. wt., 159, 168.

The 2-methyl-3-furylmethyltrimethylammonium chloride used above is prepared first by forming 2-methyl-3-hydroxymethylfuran, forming 2-methyl-3-chloromethylfuran from this compound, and then forming the quaternary ammonium chloride as follows: To a stirred mixture of 5 parts of lithium aluminum hydride and 140 parts of anhydrous ethyl ether is added dropwise over a period of 1½ hours 30.8 parts of ethyl 2-methyl-3-furoate in 140 parts of anhydrous ether. The mixture refluxes gently during the addition. After all the solution is added, the reaction mixture is stirred for one hour and then 8 parts of ethyl acetate is added slowly and stirring is continued for another twenty minutes. After this time, 180 parts of 10% aqueous sulfuric acid is added and then the ether layer is separated from the reaction mixture. The ether solution is dried with anhydrous potassium carbonate and distilled. There is obtained 18.5 parts (83% of theory) of colorless 2-methyl-3-hydroxymethylfuran boiling at 70° C./7 mm. and having a refractive index, $n_D^{25}$, of 1.4840.

*Analysis.*—Calcd. for $C_6H_8O_2$: C, 64.27%; H, 7.19%. Found: C, 64.36%, 64.17%; H, 7.33%, 7.30.

A solution of 17.46 parts of this 2-methyl-3-hydroxymethylfuran, 14.9 parts of pyridine and 35 parts of anhydrous ether is stirred and cooled to —10° C. Over a period of twenty minutes a solution of 20.4 parts of thionyl chloride in 10 parts of hexane is added dropwise to the reaction mixture, during which time the temperature rises to 12° C. The cooling bath is then removed and the mixture is stirred for thirty minutes. It is again cooled to 0° C. and a solution of 4 parts of concentrated hydrochloric acid in 45 parts of water is added. The ether layer is separated from the mixture and washed with 50 parts of 10% aqueous sodium hydroxide. After drying with anhydrous potassium carbonate, the ether solution is distilled. There is obtained 9.45 parts (46.5% of theory) of 2-methyl-3-chloromethylfuran boiling at 60.5–61° C./19 mm.

*Analysis.*—Calcd. for $C_6H_7OCl$: C, 55.19%; H, 5.41%. Found: C, 55.78%, 56.08; H, 5.89%, 5.69.

A solution of 8.8 parts of the above 2-methyl-3-chloromethylfuran in 140 parts of anhydrous ether is saturated with dry trimethylamine. The reaction mixture, protected from moisture by a drying tube, is allowed to stand at room temperature for 24 hours. The precipitate which forms during this time is collected by filtration and washed with ether in a dry nitrogen atmosphere. There is obtained 8.8 parts (69% of theory) of very hygroscopic 2-methyl-3-furylmethyltrimethylammonium chloride melting at 141–143° C.

*Analysis.*—Calcd. for $C_9H_{16}NOCl$: C, 56.99%; H, 8.50%; N, 7.39. Found: C, 55.84%; H, 8.66%; N, 7.46%, 7.40.

It will be understood that the above examples are merely illustrative and that the present invention broadly comprises, as new products, the dimers of dialkylidene five-membered heterocyclic compounds having in the 1-position of the heterocyclic ring an oxygen or sulfur joined to two annular carbons, and having attached to one of two carbons in any of the 2,3-, and 2,5-positions of the heterocyclic ring a $=CH_2$ group and to the other of these two carbons a $=CHR'$ group wherein R' is hydrogen or a monovalent hydrocarbon radical of 1 to 6 carbons, inclusive, the heterocyclic ring containing one double bond.

Thus, in addition to the specific products provided by the examples, the invention includes the dimers of the following monomers:

5-propylidene-2-methylene-2,5-dihydrothiophene
3-hexylidene-2-methylene-2,3-dihydrofuran
5-cyclohexylidene-2-methylene-2,5-dihydrofuran
3-butylidene-2-methylene-2,3-dihydrothiophene The invention also comprises the process of preparing dimers as above by subjecting the corresponding monomer to a temperature of 0° C. to 200° C. in the presence of an addition polymerization inhibitor until dimerization thereof is complete.

The examples show the use of hydroquinone and phenothiazine as polymerization inhibitors. Other addition polymerization inhibitors can be used and these include copper resinate, naphthylamines, beta-naphthol, and the like.

The dimerization reaction can be carried out in the presence of a wide variety of organic solvents providing they are inert, i.e., will not react with the reactants. Solvents other than those used in the examples include alcohols such as methanol and 2-propanol, ethers such as diethyl ether and dibutyl ether, and hydrocarbons such as n-octane and cyclohexane. In the modification of the process of this invention illustrated in Examples IV to VI, the organic liquid must not only be inert to the reactants and form an azeotrope with water but it should also be water-immiscible so that it can be readily recovered for reuse in a water separator or the like.

The cyclic dimers of this invention are particularly useful as chemical intermediates because of the unusual structure they possess. These dimers are tricyclic compounds containing two heterocyclic rings. They can be converted to cyclododecane derivatives. More particularly, 5,5'-ethylene-1,2-di(2-furyl)ethane reacts with bromine in methanol to form a methoxy derivative which is readily hydrolyzed to a water-soluble material possessing carbonyl groups, believed to be the tetraketocyclododecadiene formed by opening of the furan rings.

The dimers of this invention are also useful as biologically active materials. Further, they can be pyrolyzed to the corresponding monomers and to polymers. Ketocyclododecane, a synthetic musk, can be prepared by the following steps from 5,5'-ethylene-1,2-di(2-furyl) ethane: The dimer is hydrogenated to the tetrahydro derivative which can then be reacted with hydrogen iodide and phosphorus to give monoiodocyclododecane. This iodo compound is then reacted with potassium acetate, and the resultant product is hydrolyzed to cyclododecyl alcohol. The alcohol is then oxidized to ketocyclododecane.

As many apparently widely different embodiments of this invention may be made without departing from the spirit and scope thereof, it is to be understood that the invention is not limited to the specific embodiments thereof except as defined in the appended claims.

The embodiments of the invention in which an exclusive property or privilege is claimed are defined as follows:

1. A compound of the formula

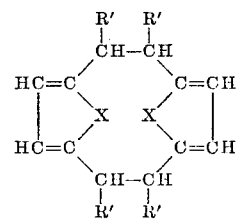

wherein X is selected from the class consisting of oxygen and sulfur, and R' is a member of the group consisting of hydrogen and a monovalent hydrocarbon radical of 1 to 6 carbon atoms, inclusive, said hydrocarbon radical being selected from the class consisting of alkyl, cycloalkyl, and aryl groups, and at least two R"s are hydrogen each in the alpha position to a different five-membered ring and the other two are identical.

2. 5,5'-ethylene-1,2-di(2-furyl)ethane.

3. 5,5'-ethylene-1,2-di(thienyl)ethane.

4. In a process for forming addition products by spontaneous homoreaction at 0° to 200° C. of a monomeric dialkylidene five-membered heterocyclic compound having in the 1-position of the heterocyclic ring a chalcogen of atomic number 8 to 16 joined to two of four annular carbons, and having attached directly to one of two carbons in any of the 2,3-, and 2,5-positions of the heterocyclic ring a $=CH_2$ group and to the other of said two carbons a $=CHR'$ group wherein R' is from the group consisting of hydrogen and monovalent hydrocarbon radicals of 1 to 6 carbons, inclusive, said hydrocarbon radicals being selected from the class consisting of alkyl, cycloalkyl, and aryl groups, said heterocyclic ring containing one double bond, the improvement of conducting the reaction in the presence of an addition polymerization inhibitor to form a dimer.

5. Process of preparing dimerized dialkylidene heterocyclic compounds which comprises adding an inert, water-immiscible organic liquid capable of forming an azeotrope with water, to an aqueous solution of a five-membered heterocyclic quaternary ammonium hydroxide having in the 1-position of the heterocyclic ring a chalcogen of atomic number 8 to 16 joined to two of four annular carbons, having attached directly to one of two carbons in any of the 2,3-, and 2,5-positions of the heterocyclic ring a $—CH_2N(CH_3)_3OH$ group and to the other of said two carbons a $—CH_2R'$ group where R' is from the group consisting of hydrogen and monovalent hydrocarbon radicals of 1 to 6 carbons, inclusive, said hydrocarbon radicals being selected from the class consisting of alkyl, cycloalkyl, and aryl groups, and having two conjugated double bonds in the heterocyclic ring, azeotropically distilling the mixture by heating at a temperature of 0° to 200° C. to remove water therefrom and continuing the heating in the presence of an addition polymerization inhibitor to thermally decompose the quaternary ammonium hydroxide to a monomeric dialkylidene compound and to form a dimer therefrom.

6. An isomeric mixture consisting of compounds represented by the formulas:
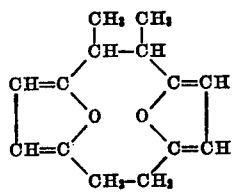
and
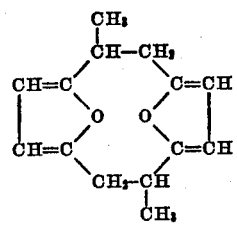
7. An isomeric mixture consisting of compounds represented by the formulas:
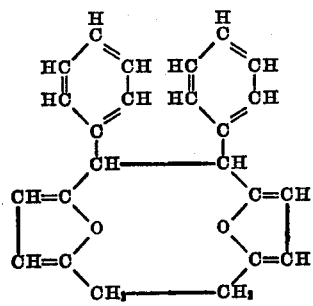
and
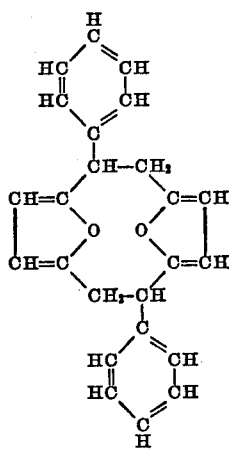
8. The dimer of 2,3 - dimethylene - 2,3 - dihydrofuran, said dimer having a melting point of 48–50° C. and being represented by a formula of the class consisting of
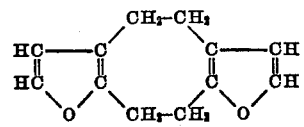
and
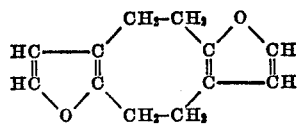
No references cited.